US006859644B2

(12) United States Patent
Wang

(10) Patent No.: US 6,859,644 B2
(45) Date of Patent: Feb. 22, 2005

(54) INITIALIZATION OF WIRELESS-CONTROLLED LIGHTING SYSTEMS

(75) Inventor: Ling Wang, Millwood, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/323,414

(22) Filed: Dec. 19, 2002

(65) Prior Publication Data

US 2004/0201448 A1 Oct. 14, 2004

Related U.S. Application Data

(60) Provisional application No. 60/363,916, filed on Mar. 13, 2002.

(51) Int. Cl.[7] .......................... H04B 1/18; G05B 19/18; H04L 12/28; H05B 37/02

(52) U.S. Cl. ................................ 455/159.2; 455/151.2; 700/3; 700/11; 370/908; 370/910; 315/153; 315/316; 315/312

(58) Field of Search ........................... 455/159.2, 151.2, 455/151.1, 153.2, 53.1, 54.2, 55.1; 700/3, 11, 13, 22; 370/908, 910, 911; 315/149, 150, 292, 316, 312

(56) References Cited

U.S. PATENT DOCUMENTS

| | | | | |
|---|---|---|---|---|
| 6,711,403 B1 * | 3/2004 | Herrmann et al. | ....... | 455/422.1 |
| 2002/0018458 A1 * | 2/2002 | Aiello et al. | ................ | 370/348 |
| 2002/0049057 A1 * | 4/2002 | Moulsley et al. | ........... | 455/436 |
| 2004/0158333 A1 * | 8/2004 | Ha et al. | ....................... | 700/3 |

FOREIGN PATENT DOCUMENTS

| | | | |
|---|---|---|---|
| WO | 02082283 | 10/2002 | ........... G06F/13/00 |
| WO | 02082618 | 10/2002 | ............. H02J/9/00 |

* cited by examiner

*Primary Examiner*—Tuyet Thi Vo
(74) *Attorney, Agent, or Firm*—Robert J. Kraus

(57) ABSTRACT

A method of initializing system components of a wireless-controlled lighting system. The system components include a remote control and a plurality of lighting units which communicate with a control master for the system via commonly-received radio communications. In order to become part of the system, each component transmits a respective request for initialization. A local control master for the system responds to each request, in turn, by allocating and transmitting a unique ID code for the requesting component. It then transmits a verify command to the requesting component which, if it has received the ID code, signals the user affirmatively.

13 Claims, 6 Drawing Sheets

INITIALIZATION OF WIRELESS-CONTROLLED LIGHTING SYSTEMS

CROSS-REFERENCE TO RELATED APPLICATIONS

This application claims the benefit of U.S. Provisional Application No. 60/363,916 filed on Mar. 13, 2002.

BACKGROUND OF THE INVENTION

1. Field of the Invention

This invention relates to wireless-control of lighting systems and, in particular, to such control which is readily adaptable to changes in the system.

2. Description of Related Art

Wireless control of a lighting system provides many advantages besides the ability of remotely switching and dimming lighting units in the system. For example, such control provides a convenient way of setting up and making changes to a lighting system and of improving energy utilization. Features such as emergency lighting control can be added without making any wiring changes. Energy utilization by the system can be regulated by a program which can be readily modified to meet changing demands.

In order for a wireless-controlled lighting system to be readily accepted by users, however, a number of considerations must be addressed. For example, the system should preferably be compatible with lighting control standards that are already in use, such as DALI (Digital Addressable Lighting Interface), which is a widely-accepted standard for wired control of lighting systems. Additionally, power consumption by any battery-powered devices in the system (such as remote controls) should be low to maximize battery life. Further, the system must be capable of unambiguously controlling selected lighting units in the system and of incorporating lighting units which are later added to the system.

Commonly, wireless-controlled lighting systems include transceivers in a remote control and in controlled lighting units for enabling communications between users and a lighting system.

Such communications (typically via IR or RF signals) are utilized to configure the lighting units and the remote control into a wireless network. If the remote is used as a master control, it is used to configure the system by, for example, binding each of the lighting units to a respective button on the remote. In one known method for effecting such binding:

- the remote transmits a command signal to put all of the lighting units into a learning mode;
- the lighting units transmit pre-assigned identification (ID) numbers to the remote;
- the remote successively transmits each of the ID numbers, causing the lighting units to light, and the user associates each newly-lighted lighting unit with a respective button on the remote.

This system is relatively simple, but if the remote is lost or becomes inoperable the entire system must be reconfigured with a replacement remote. Also, the system utilizes a proprietary communication protocol and requires that each lighting unit have a pre-assigned ID number. This limits the types of new and replacement lighting units that can be incorporated into the system.

SUMMARY OF THE INVENTION

It is an object of the invention to provide a method which avoids the foregoing disadvantages.

In accordance with the invention, a method is provided for initializing system components in a wireless-controlled lighting system where the system components and a control master communicate via commonly-received wireless transmissions. Each of the system components transmits a request for initialization. Upon receipt of a request, the control master allocates and transmits a unique ID code for the requesting system component. The control master then transmits a verification signal indicating that the ID code has been transmitted. The requesting system component transmits an affirmative response to the verification signal if the transmitted ID code has been received.

If the affirmative response is not received by the control master, the control master transmits a signal indicating that an error has occurred. If the affirmative response is received by the control master, it stores the ID code allocated to the requesting component.

The method is utilized to initialize both remote controls and other system components. Because the ID codes allocated to the system components are stored in the control master, reconfiguration of the system is simplified if the remote is lost or becomes inoperable. Also, an open standard, e.g. Zigbee, may be used for the communication protocol, thus widening the range of lighting units that can be incorporated into the system.

DESCRIPTION OF THE PREFERRED EMBODIMENT(S)

Figure 1:
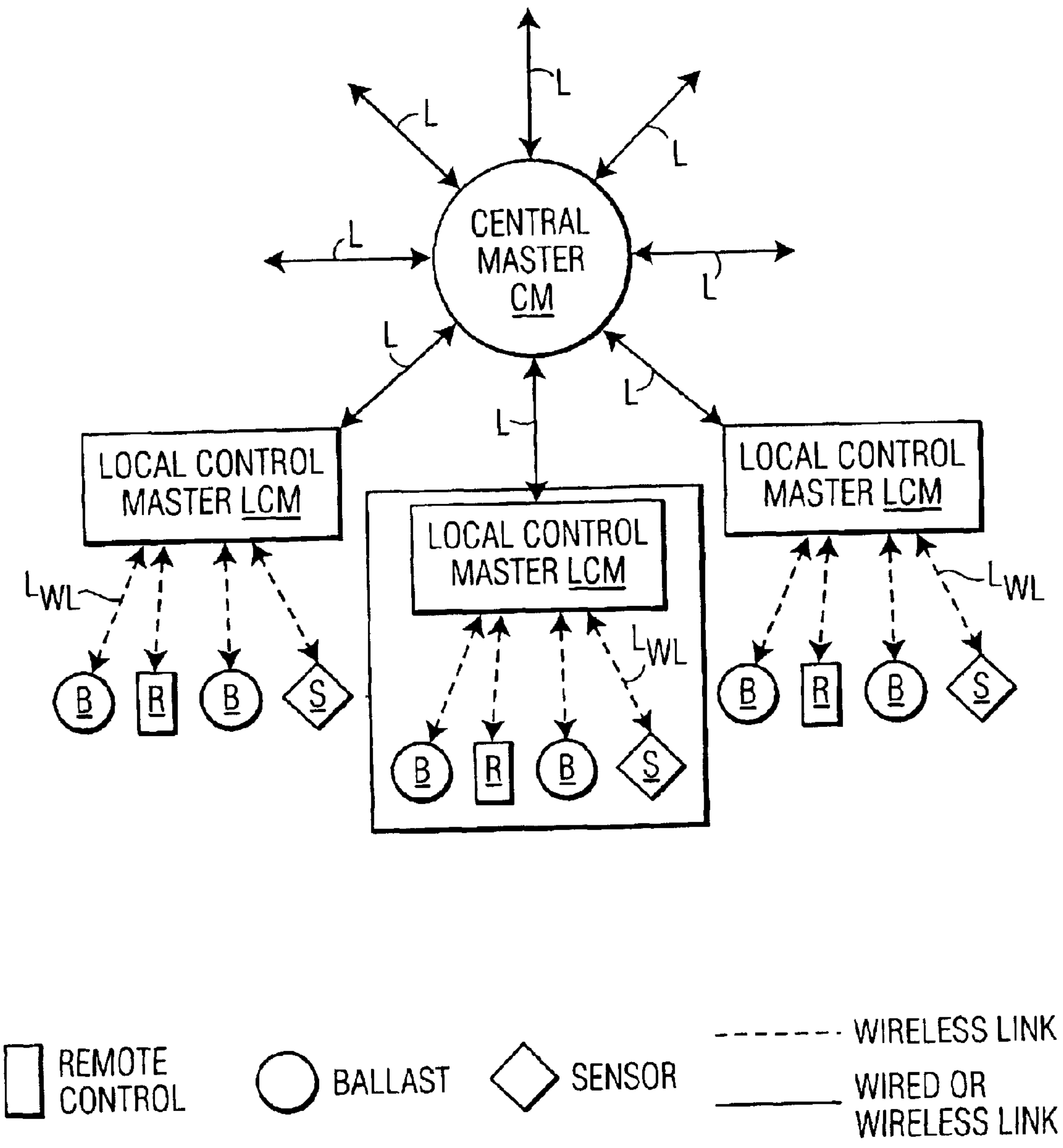
FIG. 1 is a schematic drawing of a lighting-control system incorporating an embodiment of the invention.

FIG. 1 illustrates an exemplary lighting-control system in which the invention is utilized. The system shown includes a number of local control masters LCM, each communicating with a central master CM via a wired or wireless link L. The choice of which type of link to be utilized for coupling each individual local control master to the central master is optional and depends on various factors. For example, wired links are commonly used in new lighting installations, while wireless links are commonly used in both retrofit and in new installations.

The central master CM functions to provide central control and monitoring of the entire lighting system (such as all rooms in a building or building complex), while each local control master LCM functions to provide control and monitoring within a local area (such as one or more rooms of a building). The local control masters LCM communicate via respective wireless links $L_{WL}$ to lighting-system components including lighting units B, sensors S and remote controls R. The lighting units may be of any type or combination of types, e.g. fluorescent, high-intensity discharge (HID), light-emitting diodes (LEDs), incandescent etc.

The sensors S provide the capability of detecting and reporting different types of information, e.g. the presence and/or motion of a person and ambient conditions such as light intensity and/or temperature. Each remote control R enables a user to select and control operation of lighting units within one or more local areas. Other types of system components, e.g. thermostats, powered window curtains, etc. may also be linked to the local control masters.

Each local control master LCM and the system components B, S and R to which it is linked collectively forms a local-area network (LAN). A master-slave wireless linking is established between each local control master LCM and the components B, S and R. This is achieved by including a master device in each LCM and including a slave device in each of the components B, S, and R. Similarly, a master-slave wireless linking may be established between the central master CM and each of the local control masters LCM by including a master device in the CM and a slave device in each LCM.

Generally, each local control master LCM functions to establish and coordinate operation of the respective LAN by, for example, identifying the slave devices within the LAN, initiating communications, and collecting information communicated within the respective LAN. Such collected information facilitates the formation of a wide-area network including several or all of the LANs and enables the association of a substitute remote control R to a LAN in the event that an original remote control becomes lost or inoperable.

In the preferred embodiment, the DALI standard is utilized for lighting system control. This standard was developed for wired lighting control, however, so an adaptation must be made to use it for wireless control. Such adaptation should facilitate low-power wireless communications to minimize power consumption by any battery-powered components, such as the remote controls R and any battery-powered ones of the sensors S. Preferably, this is done by utilizing an existing low-power wireless communication standard that includes a radio, a physical layer and a data link layer, and by providing one or more additional layers to serve as a carrier of DALI commands. A suitable choice is the ZIGBEE standard which is an open-industry standard proposed by the Zigbee Alliance to facilitate the proliferation of a broad range of interoperable consumer devices.

The protocol used in a ZIGBEE communications network is known as PURL (Protocol for Universal Radio Link). PURL is a simple, master-slave-oriented, networking protocol for use in low cost, short range, two-way wireless communications using radio technology. It offers transfer reliability, network configurability, application flexibility and reasonable battery life. PURL also can be used with RF wireless systems other than those employing the ZIGBEE standard.

A master device can communicate bi-directionally with slave devices and can route messages from one slave device to another by establishing a virtual link between the slave devices. Such virtually-linked slave devices are referred to as being "paired". For more information about PURL, refer to P. A. Jamieson, I. A. Marsden and S. Moridi, *Specification of the Lite System—A Specification for Low Cost Radio Communication,* Revision 0.8.5 (June 2001), which is hereby incorporated by reference.

Figure 2:
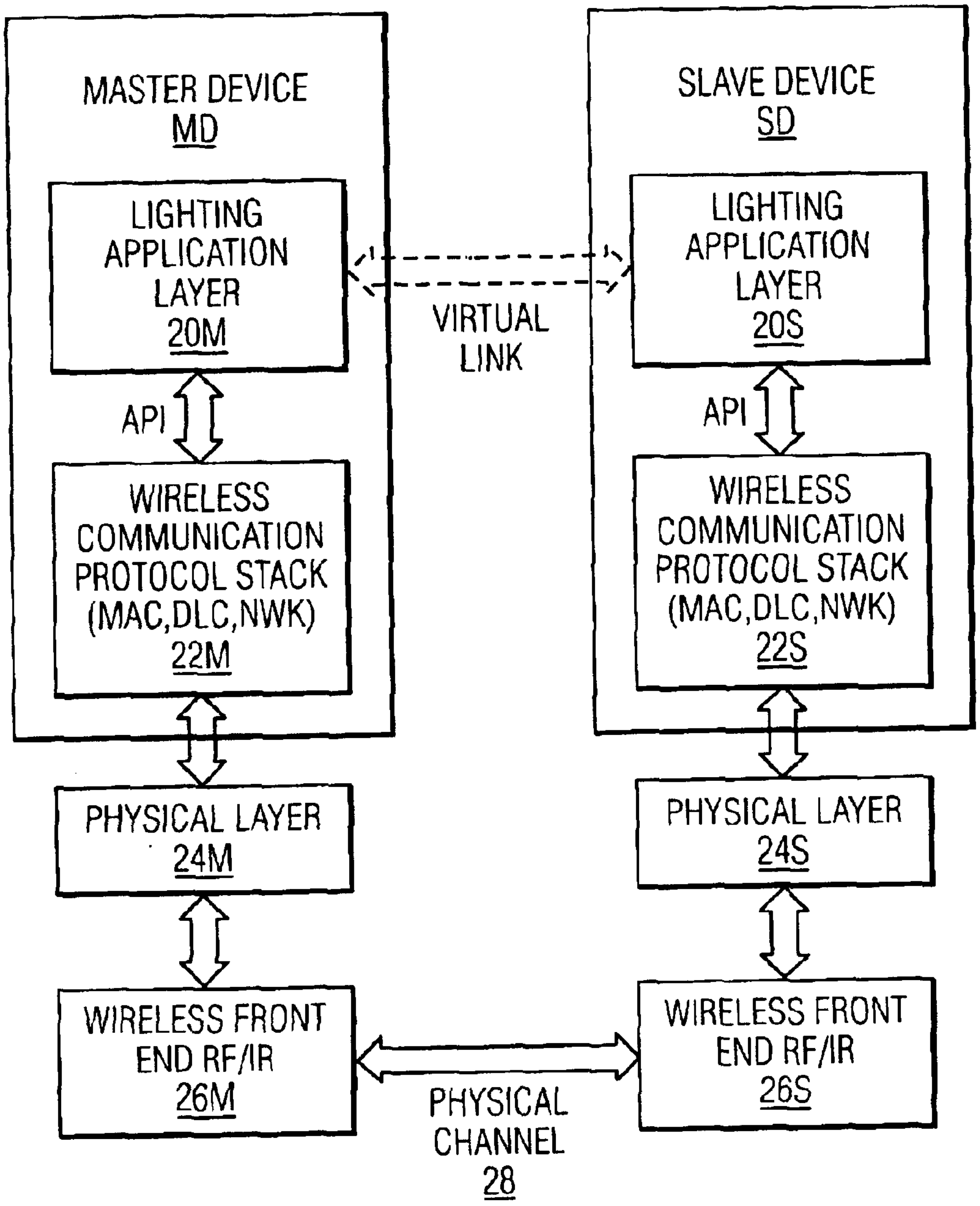
FIG. 2 is a block diagram of master and slave devices utilized in an embodiment of the invention.

FIG. 2 functionally illustrates the utilization of first and second wireless-protocol devices for implementing a master device MD and a wireless-linked slave device SD for controlling a lighting system. Only one of each of these devices is shown in this figure to simplify the description. However, in the lighting system of FIG. 1 a master device MD would be included as part of each local control master LCM and a slave device SD would be included as part of each lighting unit B, sensor S and remote control R. Preferably, each master device for a LAN is incorporated in one of the lighting units B which has the capability of providing adequate power. (In the event that the central master CM is coupled to the local control masters LCM via wireless links, CM would also include a master device and each LCM would further include a slave device for wireless communication with the master device in CM.)

Referring to FIG. 2, the devices MD and SD each include a lighting application layer 20, a wireless communication protocol stack 22 (e.g. a PURL On Air protocol stack), and a physical layer 24 and wireless front end 26 through which a radio link is established with the other device via a physical channel 28. The lighting-application layer 20 and stack 22 in each device communicate via a virtual link.

The lighting-application layer 20 in each of these devices is specifically designed to effect performance of whatever tasks are to be performed by the device. Commands from the lighting-application layer 20M in the master device MD will propagate through the respective stack 22M to the physical layer 24M, wireless front end 26M and physical channel 28. In the slave device SD, the received commands will propagate from the physical channel 28, through the respective wireless front end 26S, physical layer 24S and stack 22S to the lighting-application layer 20S for response by the particular lighting system component in which the slave device SD is included.

In designing a lighting-application layer, two of the most important areas that need to be addressed are the initialization and binding of system components. The term "initialization" refers to a procedure of configuring the network by registering each component in the network. This procedure includes assigning a unique network ID code to the component when it joins the network. The term "binding" refers to the procedure of associating the component to certain buttons or other control elements on a remote control. In PURL, initialization and binding are referred to as "enumeration" and "pairing", respectively. Binding, or pairing, is not the subject of this invention, but is mentioned here for the sake of completeness.

Enumeration/Initialization of Remote Control

Figure 3:
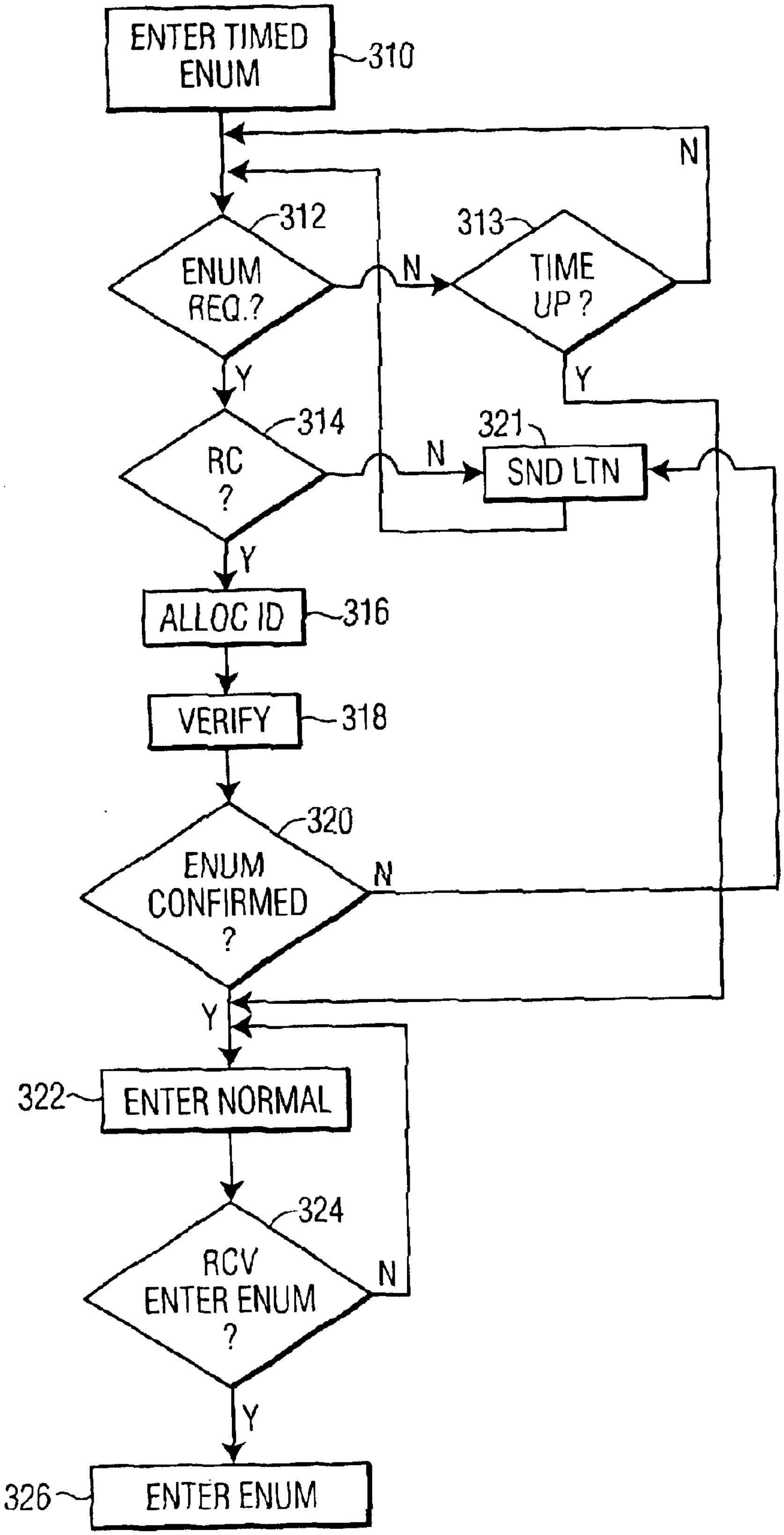
FIGS. 3–6 are flow charts of exemplary routines performed in an embodiment of the invention.
Figure 4:
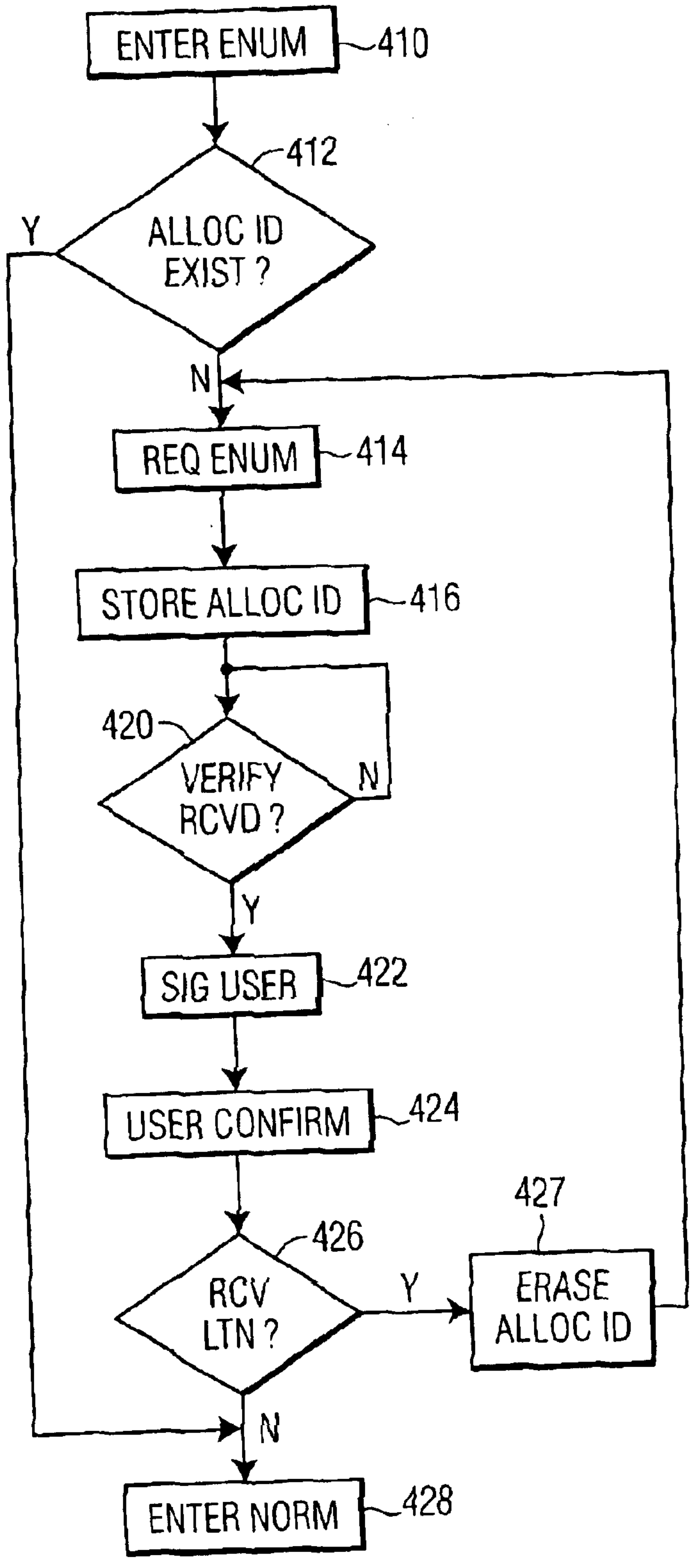

FIGS. 3 and 4 are flow charts of exemplary routines which are performed in the master device of an LCM and in a slave device of a remote control R, respectively, to enumerate the remote control when it joins the LAN including the LCM. Whenever power is turned on, the local control master enters a timed enumeration state in which it allows system components to join the LAN. The first component permitted to join the LAN is the remote-control R, which will then have control over enumeration of the other components to be made part of the LAN.

Entry of the local control master LCM into the timed enumeration state is indicated at 310 in FIG. 3. In this state, the LCM checks for reception of an enumeration request from a system component at 312. If a user presses a button on the remote control R to add it to the LAN, this button causes the remote control to enter an enumeration state at 410, check whether an ID code has already been allocated to it by the LCM at 412 and, if not, transmit an enumeration request at 414 in which this component identifies itself as a remote control.

Upon receipt of the enumeration request at 312, the LCM verifies that it is from a remote control at 314, and allocates and transmits a unique ID code for the requesting remote at 316.

Then, at 318, the LCM transmits a verify command to the newly-allocated ID code for the respective remote to give a signal to the user that the ID code has been transmitted. (If more than one LAN exists, the LCM also gives a signal, e.g. by flashing light from the lighting unit in which the LCM is located, so the user knows which LCM is being enumerated to.)

If the remote that sent the enumeration request at 414 has received the newly-allocated ID code, it will store the ID code at 416. Then, at 420, it will await reception from the LCM of the verify command and, upon receipt, will at 422 signal the user (e.g. via flashing light, sound, vibration) to indicate that the enumeration of the remote has been successful. The user will then confirm receipt of the ID code at 424 by effecting transmission to the LCM of an enumeration-confirmed signal, e.g. by pressing a designated button on the remote.

Meanwhile, the LCM checks at 320 for reception of the enumeration-confirmed signal within a set period of time (which optionally may be preset by the manufacturer or set by the user).

If not received within this period, the LCM transmits a command at 321 for the remote to leave the network. The remote checks for receipt of this command at 426. If the leave-the-network command is not received, the remote enters the normal state at 428, thus indicating that the enumeration has been successful. If it is received (indicating that an error has occurred), at 427 the remote erases the allocated ID code which was stored at 416 and then returns to 414 where it again requests enumeration. The LCM then returns to 312 and checks for reception of another enumeration request from the remote control. If no enumeration request is received within a set period (which again optionally may be preset or set by the user), as detected at 313, the LCM then enters a normal state at 322. Alternatively, if the LCM receives the enumeration-confirmed signal at 320 within the set period, it stores the ID code allocated to the remote control and then enters the normal state at 322.

In the normal state, the LCM continually checks at 324 for receipt from the remote control of a command to enter an enumeration state. Upon receipt of this command, the LCM enters the enumeration state at 326, in which state enumeration of components other than remote controls is enabled.

Enumeration/Initialization of Other Components

Figure 5:
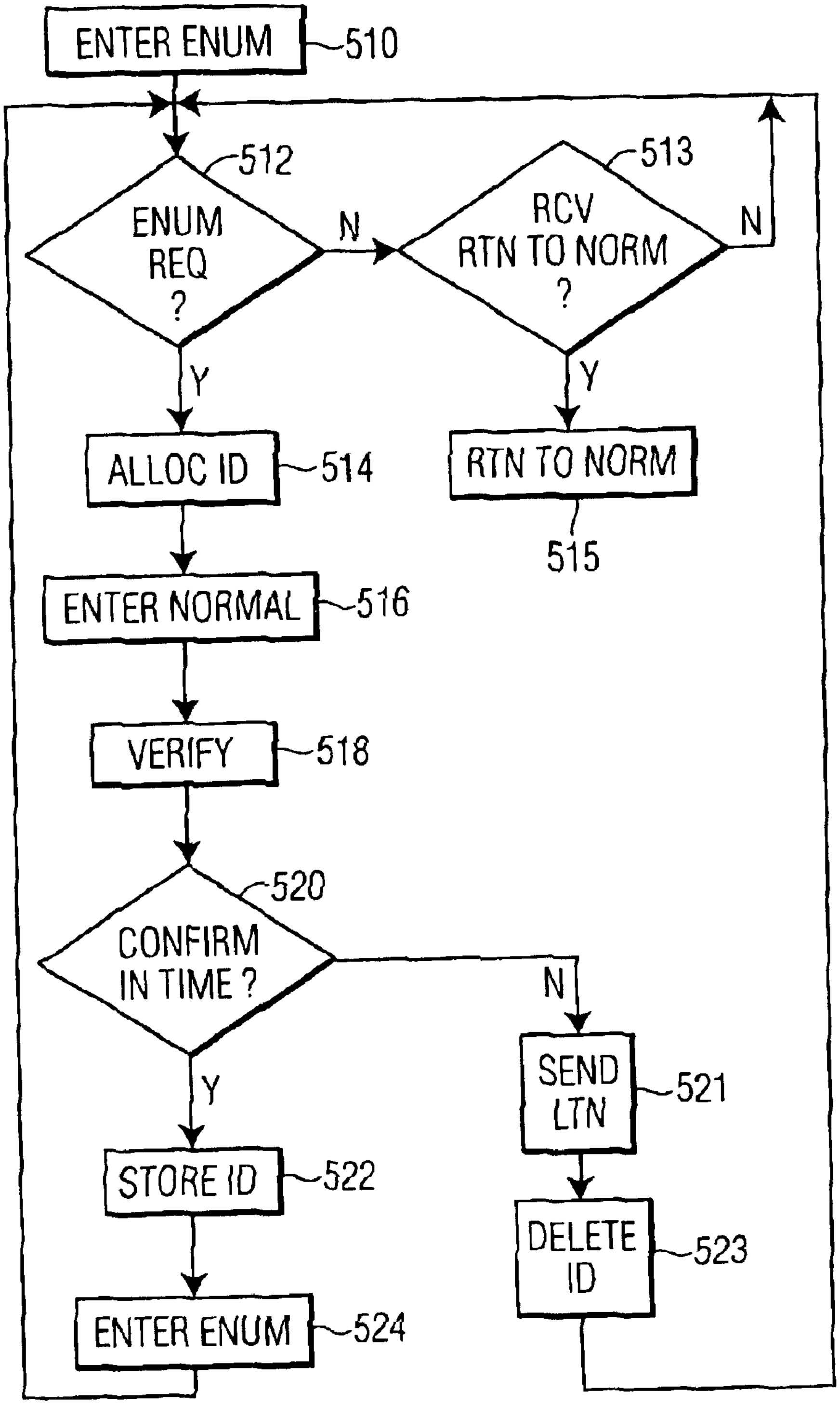
Figure 6:
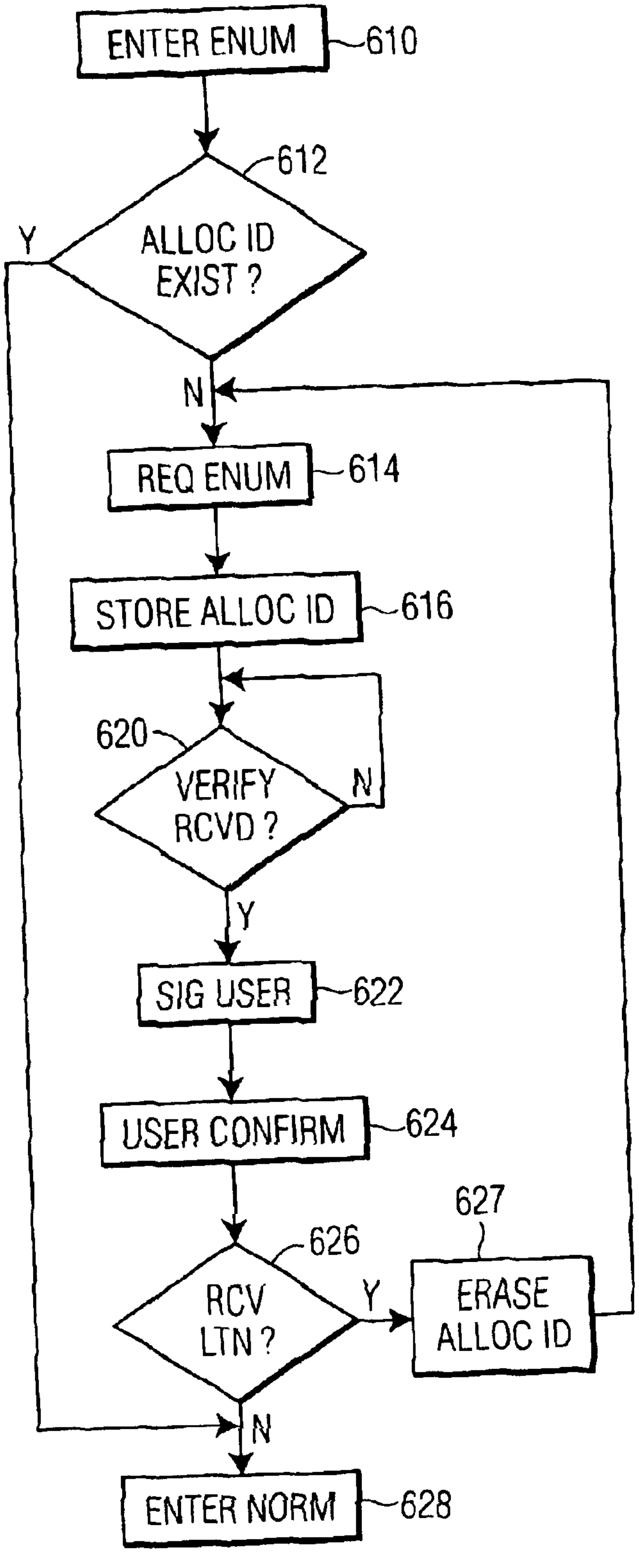

Different routines will be used in the master and slave devices for the enumeration of different types of system components. FIGS. 5 and 6 are exemplary flow charts of routines which are performed in the enumeration of a particular type of component other than a remote control. In this example, the component to be enumerated is one of many ballast-powered lighting units (e.g. fluorescent lighting units) in a LAN. Each of these lighting units includes a slave device, which is conveniently incorporated in the ballast powering the lighting unit. The LCM is also conveniently incorporated in one of the ballasts, but may be a separate unit.

In FIG. 5, the routine for the master device of the LCM begins at 510, with entry into the enumeration state. Each of the slave devices in the lighting units automatically enters an enumeration state 610 upon being powered up, as shown in FIG. 6. Each of these devices then checks at 612 to see if it has already been allocated an ID code and, if not, transmits an enumeration request at 614 identifying the requesting system component as a ballast-powered fluorescent lighting unit.

Upon receipt of the enumeration request at 512, the LCM allocates and transmits a unique ID code for the requesting lighting unit at 514 and then enters the normal state at 516, in which it locks out other enumeration requests while completing the current enumeration operation. Then, at 518, the LCM transmits a verify command to the newly-allocated ID code for the respective lighting unit to give a signal to the user that the ID code has been transmitted.

If the lighting unit that sent the enumeration request at 614 has received the newly-allocated ID code, it will store the ID code at 616 in which it will be enabled to accept communications other than those relating to enumeration. Then, at 620, it will await reception from the LCM of the verify command and, upon receipt, will at 622 signal the user to indicate which lighting unit has been enumerated. In this case the signal will originate at the lighting unit. If the lighting units to be enumerated are all visible to the user, but other lighting units are out of sight but in RF range, e.g. in another room, the signal will preferably be a visual signal, such as a flashing light to ensure that the wrong light is not being enumerated. The user will then confirm receipt of the visual indication from the lighting unit at 624 by pressing the designated button on the remote control. This effects transmission of an enumeration confirmed signal.

Meanwhile, the LCM checks at 520 for reception of the enumeration-confirmed signal within a set period of time which optionally may be preset by the manufacturer or may be set by the user. If not received within this period, the LCM transmits a command at 521 for the lighting unit to leave the network. The lighting unit (via its slave device) checks for receipt of this command at 626. If the leave-the-network command is not received, the lighting unit enters the normal state at 628. If it is received (indicating that an error occurred), then at 627 the lighting unit erases the allocated ID code which was stored at 616 and then returns to 614 where it again requests enumeration.

Alternatively, if the LCM receives the enumeration-confirmed signal at 520 in the set period, at 522 it stores the ID code allocated to the particular lighting unit and at 524 again enters the enumeration state. It then returns to 512 and checks for receipt of another enumeration request. If none is momentarily being received, it checks at 513 to see if a return-to-normal command is being received. This command is transmitted when the user presses a corresponding button on the remote and causes the LCM to return to the normal state at 515. This is done when all lighting units have been enumerated or at any time when the user wants to enable the LCM to perform a different subroutine. These include, for example, enumerating other types of system components such as sensors, in which case routines similar to those of FIGS. 5 and 6 would be used.

What is claimed is:

1. In a wireless-controlled lighting system including system components and a control master which communicate via commonly-received wireless transmissions, a method of initializing said system components, said method comprising:

a. transmission by one of the system components of a request for initialization;

b. allocation and transmission by the control master of a unique ID code for the requesting system component, said transmission also being receivable by ones of the system components other than the requesting system component;

c. transmission by the control master of a verification signal indicating that the ID code has been transmitted;

d. transmission by the requesting system component of an affirmative response to the verification signal if the transmitted ID code has been received;

e. if the affirmative response is not received by the control master, transmission by the control master of a signal indicating that an error has occurred;

f. if the affirmative response is received by the control master, storing the ID code allocated to the requesting component.

2. The method as in claim 1 where one of the system components comprises a remote control.

3. The method as in claim 1 where one of the system components comprises a lighting unit.

4. The method as in claim 1 where the verification signal is in the form of a radio signal.

5. The method as in claim 1 where one of the system components comprises a sensor.

6. A method as in claim 1 where each the requesting system component has a pre-assigned ID number.

7. A method as in claim 1 where the affirmative response is user initiated.

8. The method as in claim 1 where the requesting system component identifies itself as a specific type of component.

9. The method as in claim 8 where the control master initializes a remote control type of system component before initializing lighting unit types of system components.

10. The method as in claim 1 where the verification signal is in the form of a visual signal.

11. The method as in claim 10 where the verification signal is in the is form of a flashing light.

12. The method as in claim 1 where the system component transmits the request for enumeration automatically upon powering up.

13. The method as in claim 12 where the system component is a lighting unit.

* * * * *